United States Patent
Larson et al.

(10) Patent No.: US 6,789,420 B2
(45) Date of Patent: Sep. 14, 2004

(54) OIL FLOW SENSING

(75) Inventors: Eric K. Larson, Cumberland, RI (US); Robert F. Kellicker, Upton, MA (US)

(73) Assignee: Ark-Les Corporation, Stoughton, MA (US)

( * ) Notice: Subject to any disclaimer, the term of this patent is extended or adjusted under 35 U.S.C. 154(b) by 0 days.

(21) Appl. No.: 10/042,525

(22) Filed: Oct. 19, 2001

(65) Prior Publication Data

US 2003/0074964 A1 Apr. 24, 2003

(51) Int. Cl.[7] ............................................. G01F 23/24
(52) U.S. Cl. ..................... 73/295; 73/290 R; 73/861.02; 73/116; 73/861.08; 73/861.16
(58) Field of Search ................. 73/290 R, 295, 73/116, 861.02, 861.08, 861.16

(56) References Cited

U.S. PATENT DOCUMENTS

| | | | | |
|---|---|---|---|---|
| 4,467,919 A | | 8/1984 | Bengtsson et al. | 340/608 |
| 4,483,295 A | * | 11/1984 | Iida | 123/425 |
| 4,535,732 A | * | 8/1985 | Nakano et al. | 123/90.16 |
| 4,677,847 A | * | 7/1987 | Sawatari et al. | 73/64 |
| 5,422,807 A | * | 6/1995 | Mitra et al. | 364/184 |
| 5,804,712 A | * | 9/1998 | Staerzl | 73/117.2 |
| 5,860,224 A | | 1/1999 | Larson | 34/418 |
| 6,318,332 B1 | * | 11/2001 | Kern et al. | 123/196 S |
| 6,386,171 B1 | * | 5/2002 | Koerner et al. | 123/196 R |
| 6,434,476 B1 | * | 8/2002 | Zagone | 701/115 |

OTHER PUBLICATIONS

Anonymous. "Fluids, conductors, and conditioners" Machine Design, Jun. 1994, vol. 66, No. 12, pp. 446–466.
Erik Larson. "Experimental Development and Design of a Fluid Pressure Relief Vavle, A Thesis Submitted in Partial Fullfillment of the Requirements for the Degree of Master of Science in Mecahnical Engineering", University of Rhode Island, 1989.

* cited by examiner

Primary Examiner—Hezron Williams
Assistant Examiner—Rodney Frank
(74) Attorney, Agent, or Firm—Fish & Richardson P.C.

(57) ABSTRACT

An electrical current is passed through a thermistor to raise its temperature above the temperature of oil flowing in pulses past the thermistor. A change is measured in the temperature of the thermistor occurring with respect to one or more of the pulses. A level of oil flow is determined corresponding to the measured change in temperature. A signal is issued based on the determined flow level.

9 Claims, 7 Drawing Sheets

OIL FLOW SENSING

BACKGROUND

This invention relates to oil flow sensing.

In a two-cycle outboard marine engine, for example, lubricating oil flows in pulses, rather than continuously. The oil may be pumped by a solenoid that is triggered by an electrical signal from an engine control module (ECM). The pulses occur at a rate that depends on engine speed and may be as high as 4 Hz or higher or as low as 0.007 Hz with a pulse duration of about 40 milliseconds.

One way to make sure that oil is always reaching the parts of the engine that need lubrication is to include level switches in an oil reservoir. When the level of the oil falls unacceptably low, an alarm can be triggered or the engine can be stopped.

SUMMARY

In general, in one aspect, the invention features a method that includes (a) passing an electrical current through a thermistor to raise its temperature above the temperature of oil flowing in pulses past the thermistor, (b) measuring a change in temperature of the thermistor occurring with respect to one or more of the pulses, (c) determining a level of oil flow corresponding to the measured change in temperature, and (d) issuing a signal based on the determined flow level.

Implementations of the invention may include one or more of the following features. Measuring the change in temperature includes measuring a change in voltage across the thermistor over a period of time. The period of time corresponds to different portions of at least one of the pulses. The period of time begins at the start of one of the pulses and ends no later than the start of the next one of the pulses. The thermistor is housed in a package having an area that yields an oil flow of 10 to 20 inches per second. The area is in the range of 0.0005 to 0.002 square inches. The oil is flowing in a 2-cycle marine engine. A signal indicative of the timing of the pulses is received from an electronic control module of the engine. The signal based on the determined flow level is sent to an electronic control module of the engine. The rate of pulses is as high as 5 Hz The rate of pulses is as low as 1 pulse per day.

In general, in another aspect, the invention features an apparatus that includes a coupling having (a) two open ends adapted for connection to upstream and downstream tubes of a pulsating oil circulation system of an engine and (b) a channel configured to direct the oil to flow past a thermistor connected to a sensing circuit. The sensing circuit includes elements connected to determine a change in a voltage across the thermistor and to compare the change to a threshold.

Implementations of the invention may include one or more of the following features. The sensing circuit includes a sample-and-hold circuit connected to store a voltage across the thermistor. The sensing circuit includes a delay circuit connected to provide timing signals for the period over which the change in voltage is determined. In some implementations, the sensing circuit is a microcontroller that includes an analog-to-digital converter. Ports are connected to carry timing and flow-state signals between the sensing circuit and a control circuit of the engine.

In general, in another aspect, the invention features a marine engine that includes (a) moving parts arranged to be lubricated by oil delivered through a supply line from a supply of oil, (b) a pump configured to pump oil from the supply to the moving parts in pulses controlled by a controller, and (c) a sensor connected to receive pulses of the oil and to detect the oil flow state of the engine using a temperature sensitive electronic element and a circuit that analyzes an electrical parameter of the temperature sensitive element at times based on the pulses of the oil.

Implementations of the invention may include one or more of the following features. The temperature sensitive electronic element includes a thermistor. The circuit includes an electrical interface to a controller that controls the timing of the pulses.

Among the advantages of implementations of the invention, the response time of the sensing circuit is short, only a single thermistor is required (because the flow is pulsating), there are no moving parts, and the device is insensitive to mounting orientation and vibration.

Other advantages and features will become apparent from the following description and from the claims.

DESCRIPTION (FIG. 1 is a block diagram of a marine engine.

Figure 1:
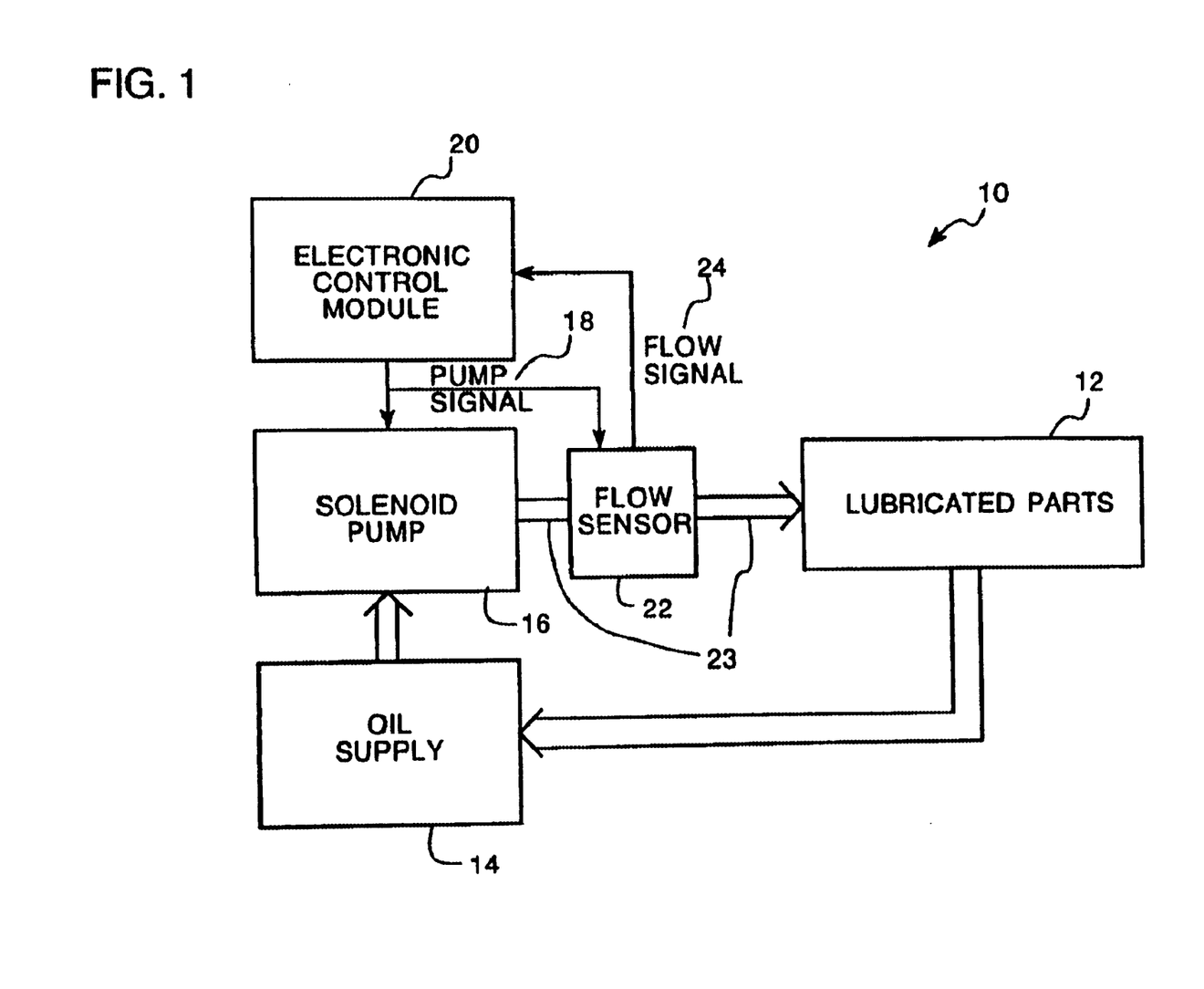

As shown in the specific example of FIG. 1, a 2-cycle outboard marine engine 10 includes lubricated parts 12 that are lubricated from an oil supply 14 using a solenoid pump 16. The solenoid is triggered in to initiate a series of pumping cycles by a pump signal 18 generated by an ECM 20. A flow sensor 22 in the oil line 23 between the pump and the lubricated parts detects whether the flow is adequate and sends a yes-or-no flow signal 24 to the ECM to indicate whether the flow is adequate or not. The flow sensor receives the pump signal 18 for use in a manner described below.

Figure 2:
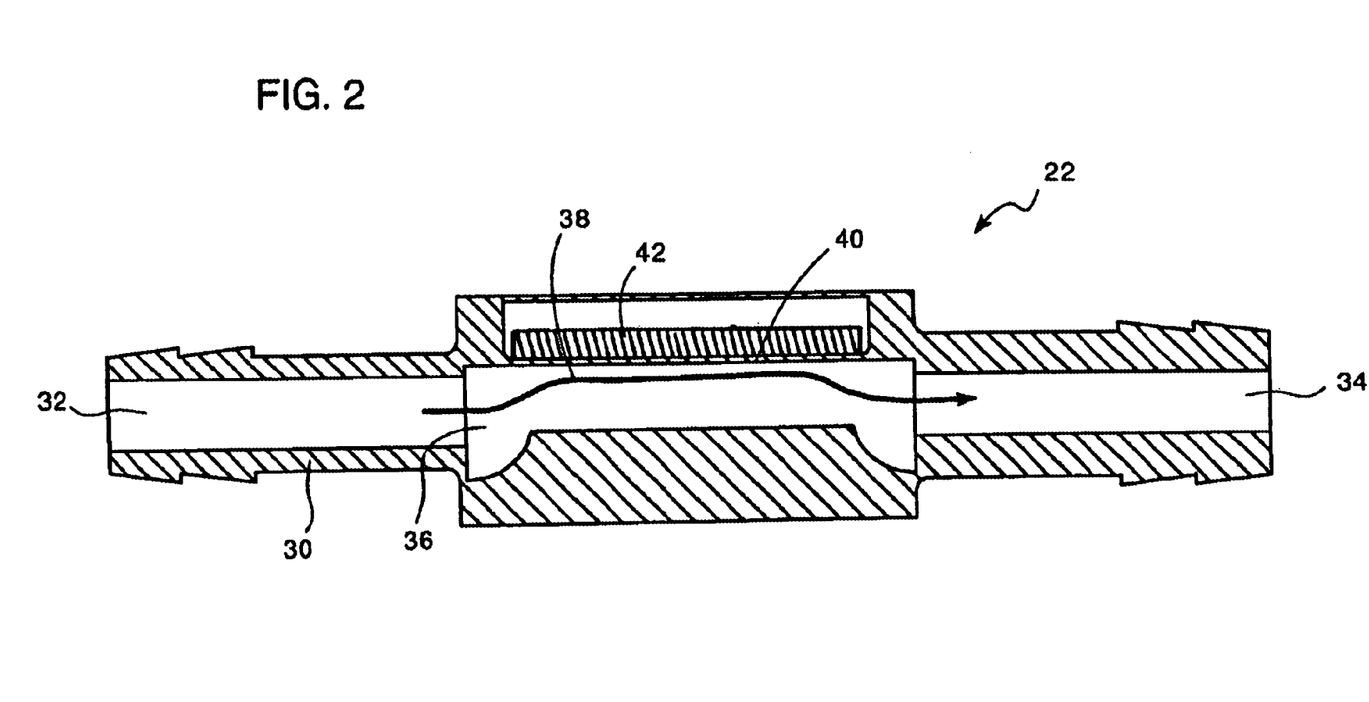
FIG. 2 is a side view in section of a flow sensor.

The flow sensor is housed in a coupling 30 that can be inserted into the oil line. The coupling includes an inflow tube 32, an outflow tube 34, and a central channel 36 that directs the flow of oil 38 so that it passes across the surface of a small chip thermistor 40 mounted on a circuit board 42.

Figure 3:
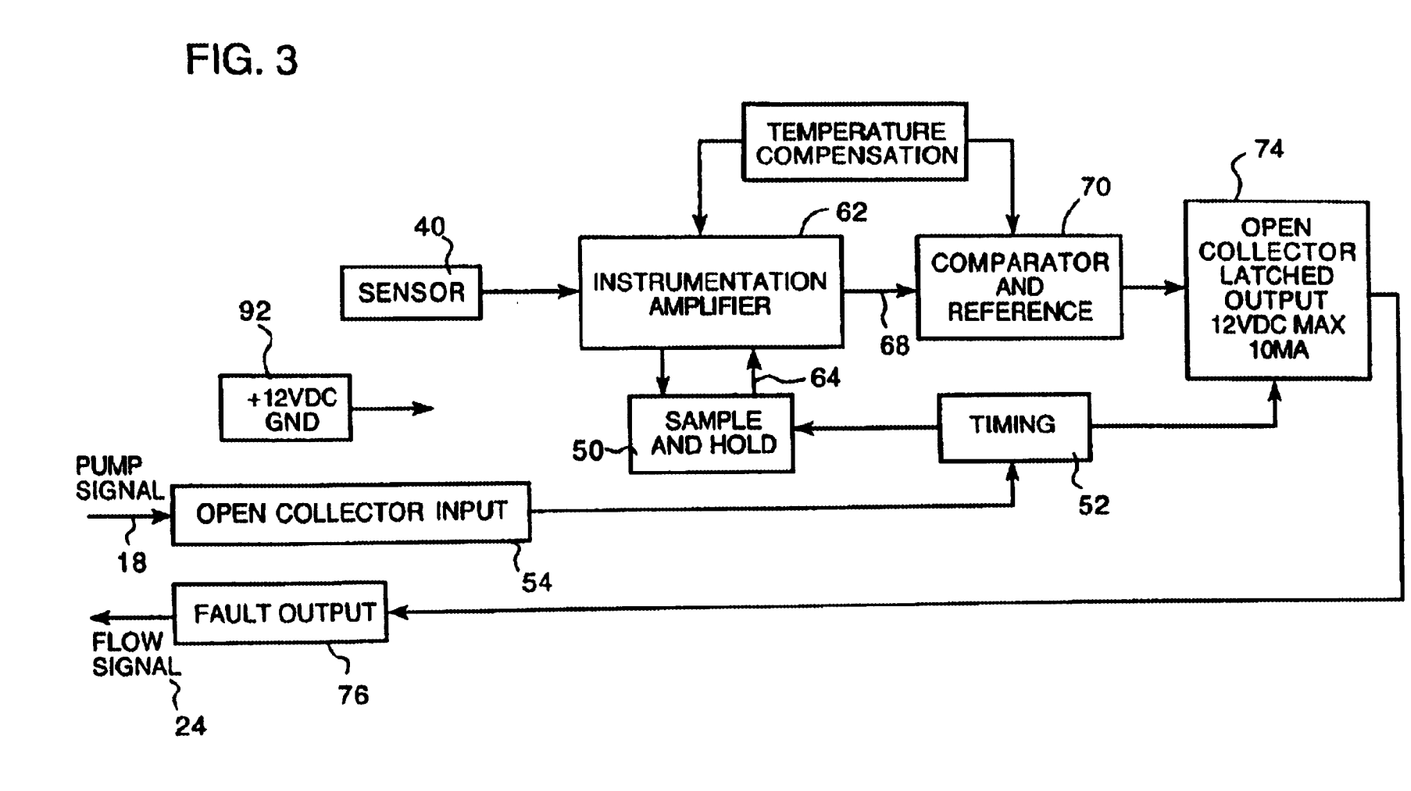
FIGS. 3 and 4 are a functional view and a schematic view of a flow circuit.
Figure 4:
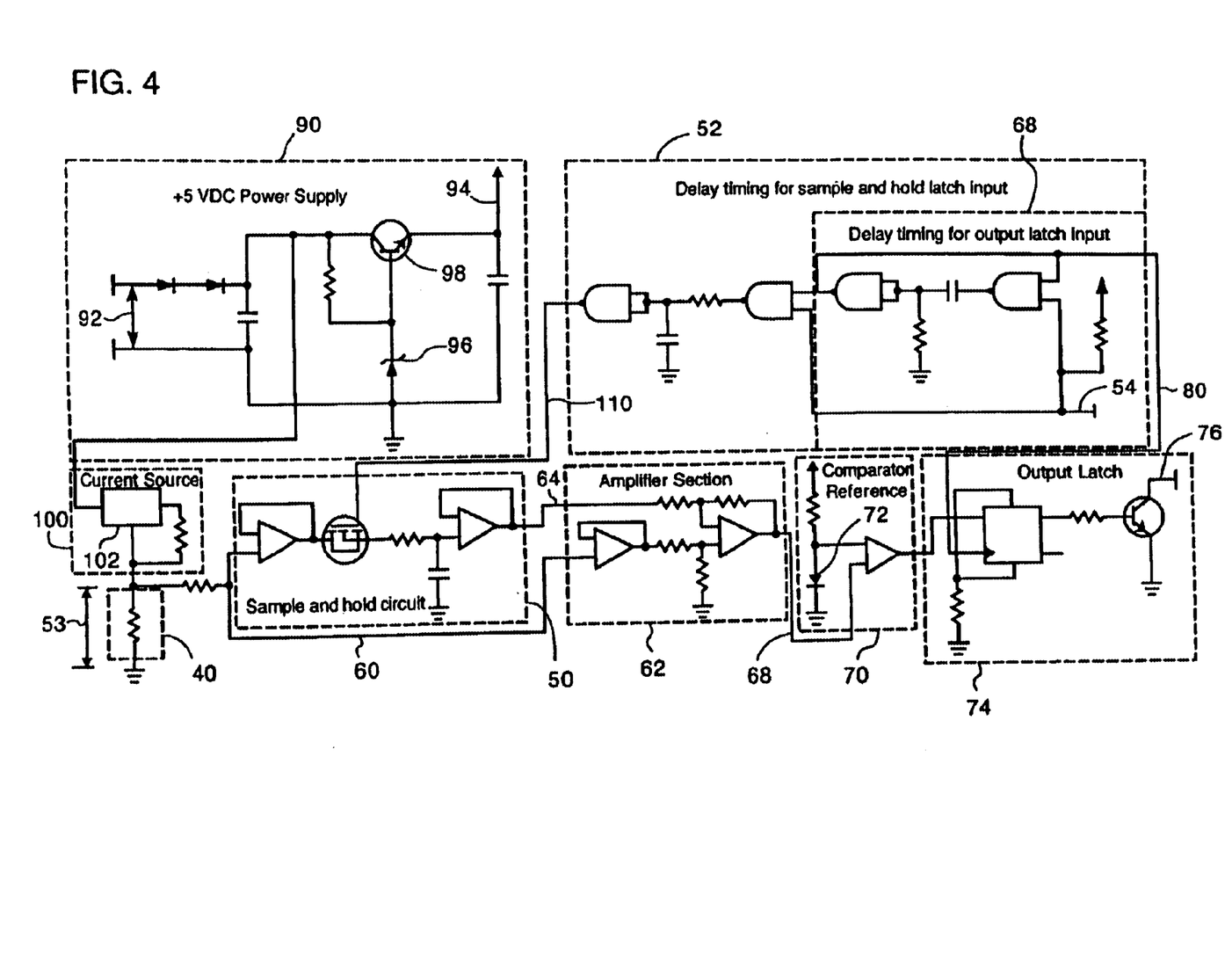

As shown functionally in FIG. 3 and schematically in FIG. 4, a circuit arranged on the circuit board 42 includes the thermistor (sensor) 40 and other elements that use the thermistor as the core element sensing and reporting oil flow.

In operation, the thermistor is self heated by a current that is driven through the thermistor. The current produces a voltage drop 53 across the thermistor that depends on the resistance of the thermistor. The flowing oil cools the sensor by an amount that depends on the mass flow rate of the oil. As the sensor is cooled, its resistance changes (increases or decreases depending on whether the thermistor has a negative or positive temperature coefficient) and in turn so does the voltage drop across the thermistor for a given driving current. The thermistor 14 may be a small (e.g., 0.04 inches by 0.02 inches in an 0402 package type) negative temperature coefficient (NTC) thermistor chip (for example, part number ERT-J0EA101J available from Panasonic). The thermal capacitance of the small thermistor is low enough (in the neighborhood of 0.2 mJ/K to 1 mJ/K [millijoules per degree Kelvin]) to permit a rapid response to changes in oil flow, rapid enough to accommodate the highest expected frequency of oil pulsation. The thermistor is designed to have an area that yields an oil flow of 10 to 20 inches per second. The area may be in the range of 0.0005 to 0.002 square inches.

Figure 5:
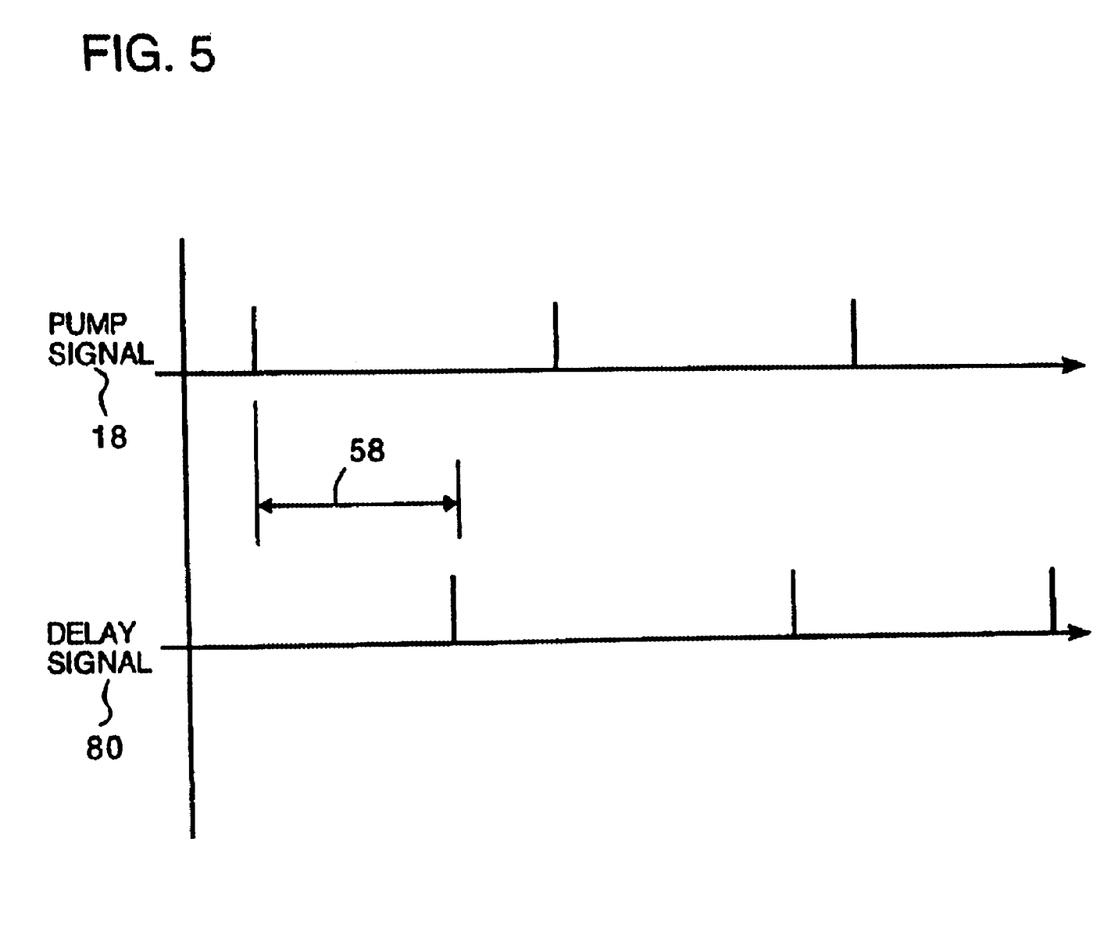
FIG. 5 is a timing diagram.

As shown in the timing diagram of FIG. 5, a sample-and-hold circuit 50 samples and holds the voltage across the thermistor 40 beginning at the start of each triggering of the oil pump. The timing of sampling is controlled by a timing circuit 52 driven by an open collector input 54 from the ECM.

An instrumentation amplifier 62 continually monitors the voltage on line 60 and combines it with the held voltage 64 from the sample-and-hold circuit. A comparator and reference circuit continually compares the combined signal 68 with a reference value 72 (indicative of an adequate level of oil flow) and delivers the result of the comparison ("yes" or "no") to an output latch 74.

At a timed interval 58 (FIG. 5) after the oil is pulsed (for example, 100 to 200 mSec, determined by a delay timer 68, a delay signal 80 is sent to cause the yes-or-no flow signal 24 to be latched to a fault output 76 for use by the ECM.

Turning to the details shown in FIG. 4, a 5-volt power supply 90 converts a supplied 8–36 volt dc input 92 to a 5-volt dc output 94 for the analog and digital circuitry. The input uses diodes for battery polarity protection. The resistor R7 supplies a bias current to zener diode 96, which regulates the 5-volt output. The NPN transistor 98 isolates the input voltage and the 5-volt output voltage. The capacitors provide noise reduction.

The 50 milliamp current source 100 supplies a bias current to the thermistor using a three terminal voltage regulator 102 configured as a current source. The resistor is used to set the current level. The input to the current source is the 8–36 volts dc and is input polarity protected.

The 50-milliampere current source causes the thermistor to self-heat to 65 degrees C. when the ambient temperature is 25 degrees C. The thermistor has a negative temperature coefficient, which results in a low resistance (approximately 22 ohms in air and 32 ohms in oil at 25 degrees C. ambient) when self-heated.

When oil at a temperature lower than the self-heated temperature of the thermistor flows over the thermistor's surface, the thermistor cools, increasing its resistance. For a given bias current, this produces a larger voltage drop across the thermistor.

The sample-and-hold circuit 60 continuously monitors the thermistor voltage 53. The timing circuit 52 sends a signal on line 110 to the sample-and-hold circuit each time the pump is actuated to cause the sample-and-hold circuit to store the thermistor voltage.

Transistor Q1 in the sample-and-hold circuit is turned off during oil flow to hold the thermistor voltage at the level that existed when the oil pumping pulse began. This voltage is stored in capacitor C3 until the transistor Q1 is turned on again at the end of the measurement cycle. Resistor R13 is used to dampen the in-rush current into capacitor C3 at storage time. Operational amplifier U6-B is a unity gain follower that isolates the thermistor from the sampling circuit. Operational amplifier U6-C configured as a unity gain follower isolates the sampling circuit from the amplification stage.

The amplifier stage 62 continually monitors the thermistor voltage P7 and the sample-and-hold output P6, taking the difference of these two signals and amplifying them. The resultant output is passed on to the comparator circuit.

Operational amplifier U6-A is configured as a unity gain follower that isolates the thermistor from the amplification stage. Operational amplifier U6-D is configured as a difference amplifier with a gain based on the threshold level. The resistors R1, R2, R3, and R5 set up the gain for the amplification stage.

The comparator/reference circuit 70 sets up the threshold level for the comparator to determine good or bad ("yes" or "no") oil flow. The threshold level is determined by the diode voltage drop (e.g., about 0.7VDC).

The comparator U2 compares the reference level to the output of the amplifier and converts the analog signal to a digital (0 volts or 5 volt) signal which is passed on to the latch circuitry 74. The diode D1 sets the reference level by the 0.7 volt drop across the forward biased diode) and is biased by resistor R11. The output signal that is passed to the latch circuitry represents an indication of whether the oil flow is adequate or not.

The latch/output circuit latches the output of the comparator circuit, and supplies signal 24 back to the ECM.

D-Latch U4-A takes the signal from the comparator on P4 and latches it into the output 76 when a latch pulse is presented on P3. The output of the latch is fed through the resistor RI 4 into the base of the NPN transistor Q2. The open collector of Q2 is fed back to the engine ECM as a digital signal representing good or bad oil flow.

The delay timer 52 takes the pump trigger signal 54 from the ECM and sets up a hold pulse 110. The hold pulse causes the sample-and-hold circuit to capture and hold the thermistor voltage for the duration of the measurement cycle. The delay timer also uses the pump signal to set up a delay pulse to latch in the result of the measurement cycle.

NAND gate U5-A & U5-B along with resistor R16 and Capacitor C6 set up the trigger pulse for the latch circuit. NAND gate U5-C & U5-D along with resistor R17 and capacitor C2 set up the hold pulse for the sample-and-hold circuit.

Referring again to FIG. 3, a temperature compensation block may be provided in some contexts if needed to assure consistency of performance in the face of changes in ambient temperature.

Figure 6:
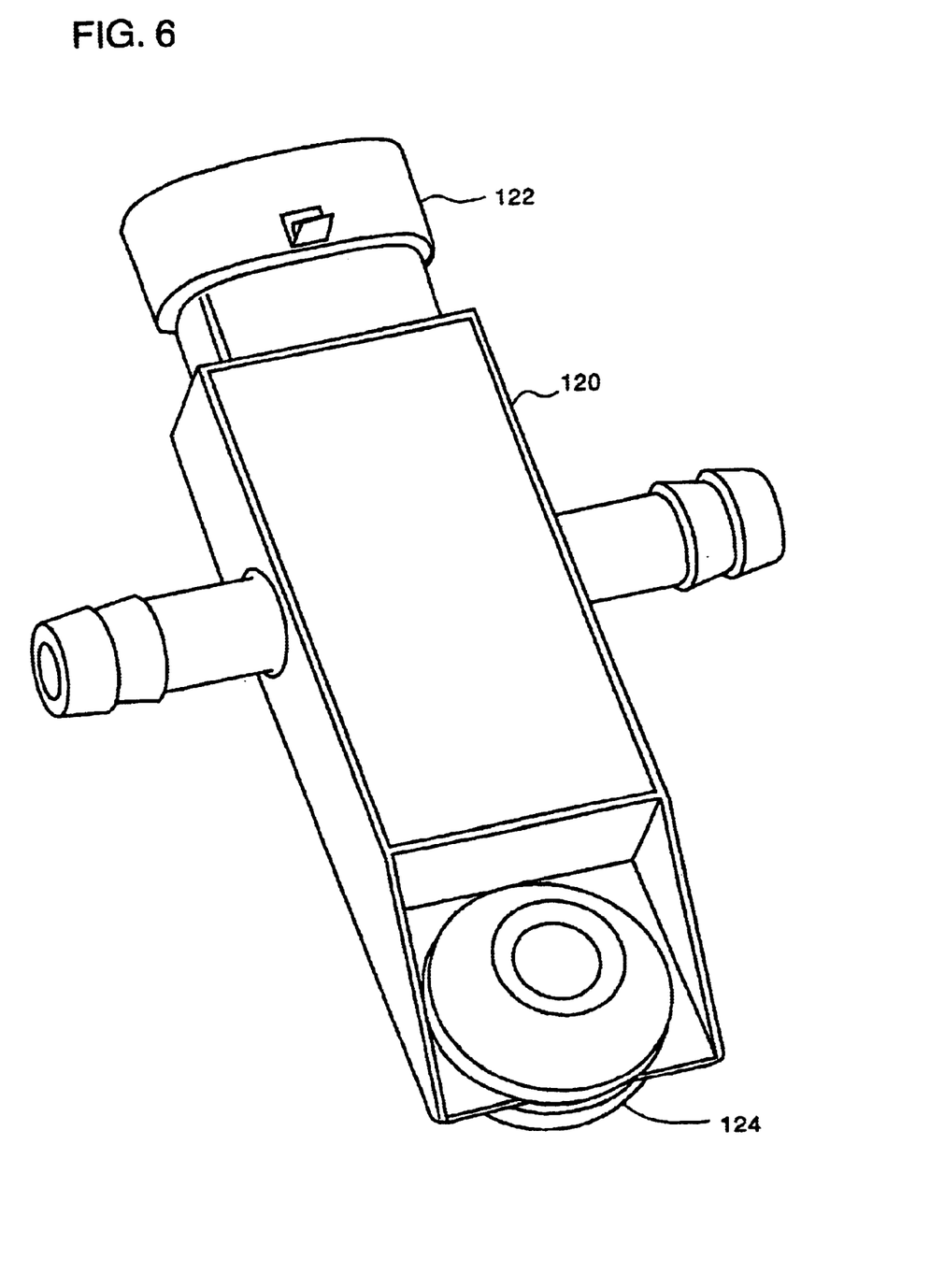
FIG. 6 is a three-dimensional view of a flow sensor.

As shown in FIG. 6, the printed circuit board and thermistor are potted in a housing 120 that also includes an electrical coupling 122 that permits connection to the ECM for carrying the signals described earlier. A rubber grommet 124 provides for vibration isolation in mounting the device to an engine block.

Other implementations are within the scope of the following claims. For example, the sensor is useful in applications other than 2-cycle outboard marine engines, including other applications in which oil is delivered to parts to be lubricating by a pulsating oil pump. The housing of the unit can have a variety of shapes, forms, and sizes, which enable the oil to flow past and cool the thermistor. Other circuit techniques can be used to set up the measurement cycle to synchronize with the ECM signals.

The sensor may be useful with other non-conductive or high-resistance fluids in addition to oil.

Figure 7:
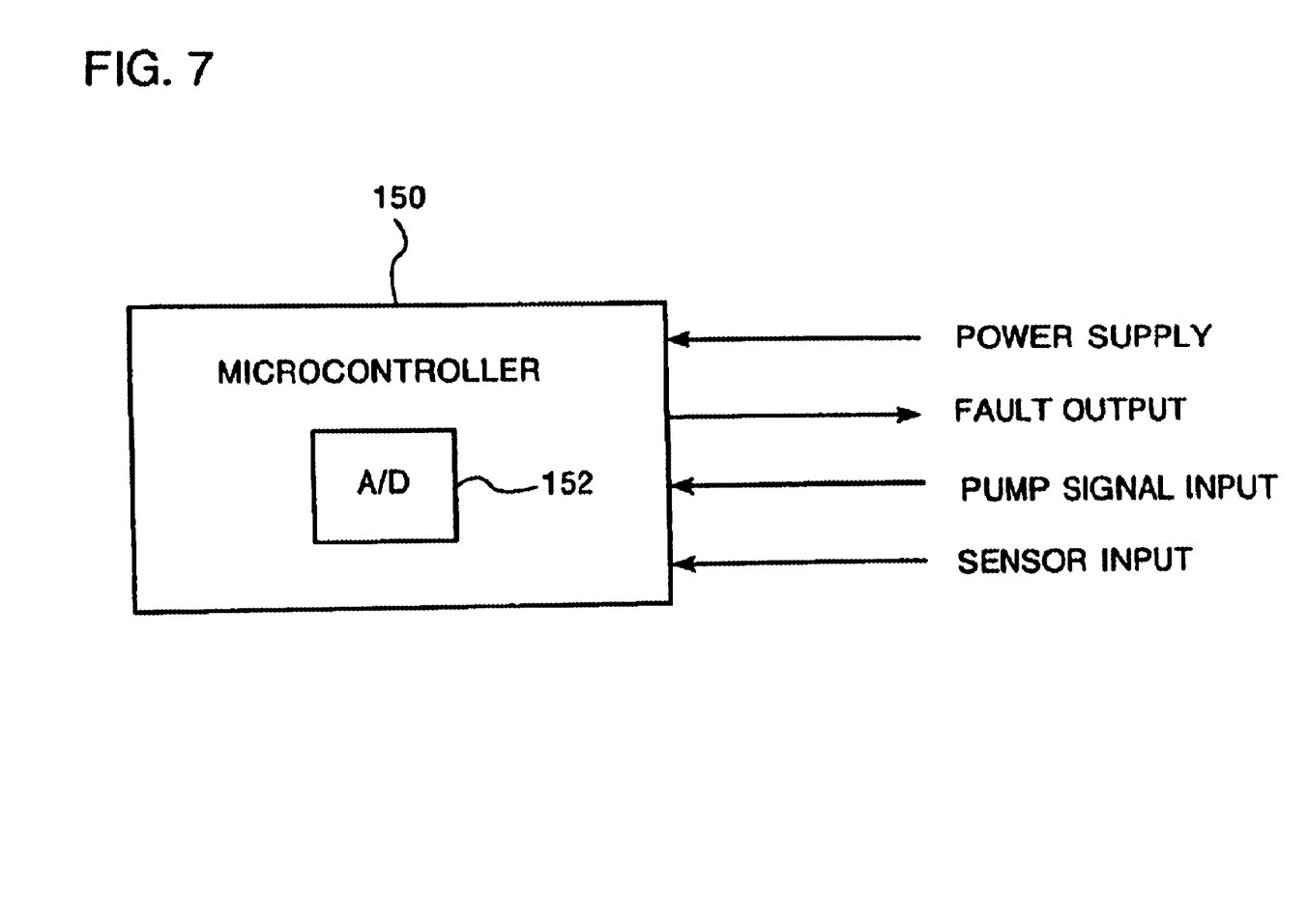
FIG. 7 is a diagram of a microcontroller.)

As shown in FIG. 7, the discrete circuitry of FIG. 4 could be replaced by a microcontroller 150 having an onboard analog-to-digital converter 152 to perform the electrical sensing and signal processing functions. For this purpose, the microcontroller would be connected to a power supply, the pump signal input, the sensor input, and the fault output.

What is claimed is:

1. Apparatus comprising a coupling having (a) two open ends adapted for connection to upstream and downstream tubes of a pulsating oil circulation system of an engine and (b) a channel configured to direct the oil to flow past a thermistor connected to a sensing circuit, the sensing circuit comprising elements connected to determine a change in the voltage across the thermistor over time, and to compare the change to a threshold, and to generate a flow-state signal based on the comparison for use by control circuit of the engine.

2. The apparatus of claim 1 in which the sensing circuit includes a sample-and-hold circuit connected to store a voltage across the thermistor.

3. The apparatus of claim 1 in which the sensing circuit includes a delay circuit connected to provide timing signals for the period over which the change in voltage is determined.

4. The apparatus of claim 1 in which the sensing circuit comprises a microcontroller that includes an analog-to-digital converter.

5. The apparatus of claim 1 also including ports connected to carry timing and flow-state signals between the sensing circuit and a control circuit of the engine.

6. The apparatus of claim 1 also comprising a diode and in which the threshold is represented as a voltage drop across the diode.

7. The apparatus of claim 1 in which the thermistor is housed in a package having an area that yields an oil flow of 10 to 20 inches per second.

8. The apparatus of claim 7 in which the area is in the range of 0.0005 to 0.002 square inches exposed to the flowing oil.

9. Apparatus comprising a coupling having (a) two open ends adapted for connection to upstream and downstream tubes of a pulsating oil circulation system of an engine and (b) a channel configured to direct the oil to flow past a thermistor connected to a sensing circuit, the thermistor being housed in a package having an area in the range of 0.0005 to 0.002 square inches exposed to the flowing oil and that yields an oil flow of 10 to 20 inches per second.

the sensing circuit comprising elements connected to determine a change in a the voltage across the thermistor over time, to compare the change to a pre-set threshold represented as a voltage drop across a diode, and to generate a flow-state signal based on the comparison for use by a control circuit of the engine, the sensing circuit comprising (1) a sample-and-hold circuit to store a voltage appearing across the thermistor, (2) a delay circuit to provide timing signals for the period over which the change in voltage is determined, and (3) a microcontroller that includes an analog-to-digital converter.

* * * * *